United States Patent Office 3,804,785
Patented Apr. 16, 1974

3,804,785
POLYVINYL ALCOHOL COMPOSITIONS CONTAINING AMYLOSE AND/OR AMYLITOL OF LOW MOLECULAR WEIGHT
Hiromi Hijiya and Mamoru Hirao, Okayama, Japan, assignors to Ken Hayashibara, Okayama, Japan
No Drawing. Filed Feb. 8, 1972, Ser. No. 224,583
Claims priority, application Japan, Feb. 15, 1971, 46/6,133
Int. Cl. C08g 9/06
U.S. Cl. 260—17.4 ST
8 Claims

ABSTRACT OF THE DISCLOSURE

Aqueous solutions of polyvinyl alcohol containing amylose and/or amylitol of low molecular weight (average or mean degree of polymerization 20-30) in an amount of not substantially more than 50% of the PVA can be dried to films soluble in cold water that are more transparent and less hygroscopic than films produced from PVA alone or modified with other starch derivatives, and are virtually impermeable to oxygen. The solutions may also be employed for sizing paper and textile fibers, for producing fibers by dry spinning, and the like.

---

This invention relates to compositions whose principal component is polyvinyl alcohol, and which are either solids or aqueous solutions of such solids.

Polyvinyl alcohol (hereinafter referred to as PVA) is a known raw material for the production of fibers, films, foams, coatings, adhesives and the like. Starch, starch hydrolyzates and dextrin are commonly used as extenders and modifiers for PVA. When films, fibers, coatings and the like are to be produced from aqueous solutions of PVA modified by starch and its afore-mentioned derivatives, the modifiers increase the viscosity of the aqueous PVA solutions and reduce the transparency of the solid bodies obtained by drying the solutions. Dextrin present in such bodies makes the same hygroscopic and tacky and reduces their mechanical strength.

It has now been found that the properties of solids otherwise essentially consisting of PVA and the processing characteristics of aqueous PVA solutions can be improved significantly by amylose or amylitol of relatively low molecular weight having a degree of polymerization substantially restricted to the range of 10 to 50.

Amylose is a straight-chained 1,4-glucan and amylitol is the corresponding alcohol practically free from terminal reducing groups. The term "degree of polymerization" as employed herein with reference to these compounds indicates the number of six-member carbon chains linked in each molecule by $\alpha$-1,4-glycosidic bonds. The terms "amylose" and "amylitol" will be understood to refer to compounds having the afore-mentioned relatively low degree of polymerization unless specifically stated otherwise.

The manner of preparing amylose and amylitol from starch has been disclosed earlier in detail, and will be described here only briefly.

When corn starch is dispersed in water, and the slurry so produced is gelatinized at elevated temperature, the amylopectin in the gel can be debranched by the action of isoamylase or pullulanase, preferably the isoamylase of certain strains of Pseudomonas. The fermentation mixture contains the long-chained amylose originally present in the starch and amylose having short, linear chains produced by the enzyme from the amylopectin. The amylose can be fractionated according to degree of polymerization by gradually cooling a hot solution of the carbohydrate mixture, amylose of greater chain length being precipitated at higher temperature than amylose of lower molecular weight. When the starting material is glutinous rice or waxy corn starch which contain amylopectin only, removal of long-chained amylose from the product of fermentation with isoamylase is avoided.

Any starch other than corn starch may be employed as the starting material for the amylose of the invention. Gelatinization of a slurry containing 5% to 20% starch can be brought about at 100° to 170° C, and the gelatinized starch is cooled to 45°–60° C. before being exposed to isoamylase or pullulanase which break the $\alpha$-1,6-glycosidic bonds in amylopectin. The optimum pH and temperature vary somewhat with the specific enzyme used, but a pH of 3–6, and a temperature of 45°–60° C. are usually most effective.

The preferred enzyme at this time is the isoamylase produced by *Pseudomonas amyloderamosa* which debranches amylopectin in about 24 to 48 hours at 45° C. and at pH 3.0–5.5. The long-chained amylose initially present in the starch precipitates from the fermentation liquid at about 40° C., and the short-chained amylose of the invention is precipitated from the mother liquor by partial evaporation and cooling to 5° C. The precipitate may be further fractionated by dissolving it in hot water and gradually cooling the solution.

The recovered product is amylose having a mean or average degree of polymerization (D.P.) of 20–30, and essentially consisting of molecules having a D.P. of 15–50, the portion of higher and lower D.P. being without practical significance. It is altogether different from dextrin of similar mean D.P., but inherently containing a large amount of branched molecules and having a wide spectrum of individual D.P. values.

Amylitol is obtained from the amylose of the invention by hydrogenation in the presence of Raney nickel. An aqueous amylose solution having a concentration of 5% to 45% is readily hydrogenated at a hydrogen pressure of 150 atmospheres and at a temperature of not more than 150° C. until the reducing terminal groups are converted to non-reducing primary alcohol groups. The catalyst is removed from the hydrogenation mixture, and the amylitol is recovered from its solution. Its solubility in water is higher than that of the amylose from which it was produced.

The hydrogenation reaction does not significantly affect the D.P., and both the mean D.P. and the distribution of the D.P. values in the amylitol are virtually the same as the corresponding properties of the amylose from which the amylitol was prepared. Amylitol is chemically inert, stable at elevated temperature, and not hygroscopic.

The amylose and amylitol of the invention are closely similar in their chemical structure to PVA, and highly compatible with PVA in aqueous solution. Solutions of PVA containing amylose and/or amylitol produce films and other shaped bodies which are smooth and transparent without showing any lack of homogeneity when elementary precautions are observed. Films are produced by casting a layer of the solution on a smooth or polished surface and quickly removing the water. Similarly smooth and transparent filaments or fibers are obtained by extruding the solution through a suitable spinning nozzle into hot air or other inert hot gas which quickly evaporates the water present. Foamed bodies can be produced by admixing to the aqueous solution a foaming agent which decomposes and produces a gas at the drying temperature. Films formed on a substrate by casting, spraying, or in any other conventional manner may be employed for protecting the substrate against moisture and atmospheric oxygen to which the films are sufficiently impervious to provide a permanent barrier. The solid bodies formed by removal of water from the joint aqueous solutions of PVA with amylose and/or amylitol are more readily soluble in water than the PVA employed. This is an advantage when films are employed for wrapping or packaging food, and when sizing compositions for paper or textile fibers are based on PVA modified with amylose and/or amylitol. The compositions of the invention are water-soluble and biodegradable in aqueous media.

Amylose and amylitol improve the transparency of PVA whereas dextrin, starch hydrolyzates, and starch reduce this transparency. A film 0.01 mm. thick and consisting of PVA may typically have a light permeability of 80%. When a film of the same thickness is prepared from a mixture of the same PVA with amylose and/or amylitol, its transparency may be improved to 85% to 98%.

Amylose and amylitol make PVA films practically impermeable to atmospheric oxygen, and such films are employed to advantage for packaging materials sensitive to oxygen such as many food products, enzymes, pharmaceuticals and other chemicals.

Amylose and amylitol do not increase the viscosity of an aqueous PVA solution, and they permit more concentrated solutions to be prepared than are available from PVA modified with starch of dextrin, thereby facilitating the manufacture of cast films, of dry-spun fibers, of protective coatings, and the like.

The PVA employed in the compositions of the invention is chosen according to well-understood criteria to suit the intended application since the properties of the PVA partly control those of the composition. PVA having a D.P. of 500 to 2000 was found to be suitable for all applications mentioned if it was at least 85% free from acid moieties of the ester, normally the acetate radical, from which the PVA was produced. The degree to which such acid moieties are absent in the PVA will be referred to hereinafter as saponification value, and grades of PVA having saponification values of 88%–90% and 98%–99% are commercially available and suitable for applications of this invention. If so desired, PVA of different, particularly lower D.P. and different saponification value may be chosen without losing the benefits derived from the simultaneous presence of amylose and/or amylitol.

Significant benefits acn be observed when the amount of amylose and/or amylitol is as low as 5% based on the weight of the PVA, and the modifying material should not exceed 60%, and preferably be not much higher than 50%, again based on the PVA weight, if best mechanical strength is to be maintained and inhomogeneity in the solid product is to be avoided. Under otherwise analogous conditions, amylitol may be employed in greater amounts than amylose because of its greater solubility in water, and the products obtained are more stable at elevated temperature and more fully transparent. Quick removal of the water in the formation of a solid body of the invention from an aqueous solution reduces the hazard of premature precipitation of one component. A stream of dry, hot air or other hot inert gas is preferably employed in evaporating the water. Few precautions are needed if the amylose and/or amylitol does not exceed 30% of the weight of the PVA.

Films and other shaped bodies can be formed from aqueous solutions containing only PVA and the modifiers of the invention. However, polyhydric alcohols in amounts up to 50% of the PVA weight may be employed to improve the pliability of films and similarly affect the properties of other shaped bodies of the invention in a manner conventional in itself. Suitable polyhydric alcohols include glycerol, propyleneglycol, sorbitol, maltitol, trimethylolpropane, diethyleneglycol, and mixtures of the same. Maltitol and its mixtures with glycerol and propyleneglycol have been found to impart most desirable properties to the modified PVA compositions of the invention. More specifically, these plasticizers further reduce the amount of light absorbed and the amount of oxygen which can pass through films and other shaped bodies of the invention. As little as 5% plasticizer, based on the weight of the PVA present, produces significant effects in most cases, but the amount required is generally controlled by the intended application. When the modified PVA compositions of the invention are employed for sizing paper or textiles, they may additionally contain conventional auxiliary agents, such as Turkey red oil.

Films prepared according to this invention have an equilibrium moisture content of typically 13% to 15% when exposed to air at room temperature having a relative humidity of 80%–90%, and they do not show tackiness after prolonged exposure to a humid atmosphere. Their tensile strength is 500 to 600 kg./cm.$^2$ and superior to films prepared from PVA alone.

Sizing compositions of the invention for textiles are not significantly different from the film-forming compositions except for generally lower concentrations of about 3–6% solids. The PVA employed preferably has a D.P. of 1000–1700, and the amylose and/or amylitol is employed in amounts of 5% to 35% of the weight of the PVA.

Paper sizing compositions preferably are prepared from PVA having a relatively high D.P., such as 1700, and being as completely saponified as possible. The solids content of the composition may be between 2 and 8% depending on the nature of the paper, and should include 5% to 30% amylose and/or amylitol based on the PVA weight.

Dry-spinning compositions preferably contain 10% to 30% amylose and/or amylitol and 10% to 20% plasticizer, all based on the PVA present. The water resistance of the spun filaments may be improved by treatment with formaldehyde in a manner known in itself.

Other applications of the solid compositions of the invention and of their aqueous solutions or dispersions will readily suggest themselves to those skilled in the art on the basis of the above teachings.

The following examples are further illustrative of this invention.

EXAMPLE 1

One part PVA having a D.P. of 1700 and a saponification value of 98% was dissolved in nine parts water at 90° C. Amylose having a mean D.P. of about 25 and produced from waxy starch in the manner described above was separately dissolved in the minimum amount of boiling water necessary to produce a uniform solution. The two solutions were mixed in a ratio to provide an amylose content of 15% in the mixture, based on the PVA present.

The aqueous mixture was held at 90° C. until it was poured on a clean, polished metal plate, and the cast film so produced was dried in a stream of air at 100° C. The film stripped from the metal was fully transparent, non-tacky, and stable in ambient air over a wide range of moisture and temperature values. Its mechanical strength was adequate for packaging purposes, and it was readily soluble in water.

EXAMPLE 2

A solution containing PVA and amylose was prepared as in Example 1. It was further mixed with 10% glycerol based on the weight of the PVA, and a film was cast and dried as in Example 1. The film differed from that produced in Example 1 by even greater pliability. It had the same desirable transparency, solubility in water, mechanical strength, and lack of tackiness.

EXAMPLE 3

PVA having a D.P. of 1700 and a saponification value of 88% was dissolved in nine times its weight of hot water. Amylitol prepared as described above was separately dissolved in water at 90°–95° C. to produce another 10% solution. The two solutions were mixed at a ratio of 5:1, and a mixture of equal amounts of maltitol and glycerol was added as a plasticizer in an amount of 10% based on the weight of the PVA.

Air bubbles formed in the liquid by intensive stirring were removed, and the deaerated liquid was cast on a polished metal plate and dried in a stream of air at 95° C. The film stripped from the substrate had a transparency of 90%, was stable in humid air, readily water-soluble, practically impermeable to atmospheric oxygen, non-tacky, and did not hold a static electric charge. Its mechanical strength was good for use as a wrapping or packaging material.

EXAMPLE 4

A 10% solution of PVA in hot water was prepared as in Example 1 and was mixed with a dispersion of 1 part amylitol in nine parts hot water to make the amylitol content of the liquid mixture 25% based on the weight of the PVA. After addition of glycerol in an amount of 15% of the PVA, the liquid was cast as a film on a polished, horizontal metal plate, and was dried with air of 100° C. The film supported on the metal plate was kept at room temperature in an atmosphere of 50% relative humidity until it reached constant weight.

Its transparency, solubility in water, strength, and non-tackiness were not significantly affected by the storage at high humidity.

EXAMPLE 5

An aqueous 10% solution was prepared from PVA having a saponification value of 88%. A dispersion of amylose of low molecular weight in nine parts of water at 110° C. was prepared separately, and the two liquids were mixed in a ratio to make the amylose content of the mixture 30% of the PVA by weight. Glycerol and maltitol were added as a plasticizer as in Example 3, and the hot aqueous mixture was poured on a polished metal plate and dried quickly in an air stream at 100° C.

The film so obtained had good toughness, transparency, smoothness, and gloss, and readily dissolved in water at 30° C. after having been stored at a relative humidity of 50%. It was 0.2 mm. thick and had a tensile strength of 500 kg./cm.$^2$. It was practically non-tacky.

EXAMPLE 6

A 10% PVA solution, prepared as in Example 5, was mixed in a volume ratio of 10:3 with an aqueous 10% dispersion of equal parts of amylose and amylitol. Enough of a 1:1 mixture of glycerol and amylitol was added to make the plasticizer content of the resulting film-forming liquid 35% of the PVA present.

A film prepared from the liquid in the manner of Example 5 had a tensile strength of 500 kg./cm.$^2$ and was closely similar to that prepared in Example 5 except for greater pliability.

EXAMPLE 7

A film-forming liquid was prepared from one part by weight of an aqueous 10% PVA solution (D.P. 1700, 98% saponification), 0.2 part hot, aqueous, 10% solution of amylose of low-molecular weight, and 0.1 part hot, aqueous, 10% solution of amylitol. The liquid was sprayed on the freshly polished surface of a steel plate, and the coating formed was dried in a stream of air at 70° C.

For comparison purposes, another steel plate was coated under otherwise identical conditions with an aqueous 10% PVA solution mixed with 0.3 part aqueous, 10% solution of a starch hydrolyzate having a dextrose equivalent of 20.

Both coated plates were stored at 30° C. and 80% relative humidity. Partial rusting was apparent on the comparison plate after three months. The plate coated with the liquid of the invention was still free from rust when the test was ended after twelve months. The difference in rust resistance between the two plates is due to the low hygroscopicity and oxygen impermeability of the coating of the invention.

EXAMPLE 8

A sizing composition was prepared by intimately mixing six parts of an aqueous 3.5% solution of PVA (D.P. 1700, saponification 98%) and four parts of an aqueous 3.5% solution of amylitol. Another composition was prepared for comparison purposes and contained an oxidized starch instead of the amylitol.

Both compositions were appied to the same paper of good quality on a size-press at a machine speed of 200 m./minute and a temperature of 60°–65° in an amount controlled to make the weight of the applied solids 0.55 to 0.60 g./m.$^2$.

The paper sized with the composition of the invention was superior to the comparison paper by about 10% in the values for IGT pick, smoothness, and surface gloss, as determined by standard testing methods, and by about 30% in its oil resistance.

A sizing composition of the invention in which the amylitol was replaced by amylose in an amount equal to that of the PVA gave results slightly inferior to those obtained with amylitol, but still significantly superior to the comparison composition.

EXAMPLE 9

Three aqueous sizing compositions were prepared. A conventional composition was prepared to contain 4.2% PVA (D.P. 1500, 98% saponification), 1.8% corn starch, and 0.3% Turkey red oil. The two other compositions contained 1.8% amylitol and 1.8% amylose of low molecular weight respectively instead of the corn starch.

Each composition was applied at 95° C. to a cotton warp in an identical manner using a cylinder type paste applicator, and each warp was dried and wound on a beam. Improved durability was found in the warps sized with the compositions of the invention.

Upon further investigation, it was found that the same favorable results could be achieved with smaller amounts of the compositions of the invention as compared to the conventional composition because of their high affinity to the cotton fibers. Under otherwise identical conditions, compositions containing amylitol were slightly more effective than those containing the amylose of the invention.

The warps carrying the compositions of the invention were readily desized by treatment with water alone, whereas the conventional composition could not readily be removed without the use of an enzyme.

While the invention has been described with reference to specific embodiments, it is to be understood that it is not limited thereto, but is to be construed broadly and restricted solely by the scope of the applied claims.

What is claimed is:

1. A composition which is a solid or an aqueous dispersion of said solid, said solid consisting essentially of an intimate mixture of polyvinyl alcohol and of at least one member of the group consisting of amylose and amylitol, said at least one member having a mean degree of polymerization of substantially 10 to 50, and being present in said solid in an amount of 5% to 60% of the weight of said polyvinyl alcohol.

2. A composition as set forth in claim 1, wherein the amount of said at least one member is smaller than 50% of the weight of said polyvinyl alcohol.

3. A composition as set forth in claim 2, wherein said solid further contains an amount of a polyhydric alcohol effective as a plasticizer for said mixture.

4. A composition as set forth in claim 3, wherein said polyhydric alcohol is glycerol, sorbitol, maltitol, propyleneglycol, trimethylolpropane, or diethyleneglycol.

5. A composition as set forth in claim 3, wherein the amount of said polyhydric alcohol is smaller than 50% of the weight of said polyvinyl alcohol.

6. A composition as set forth in claim 1 which is a solid.

7. A composition as set forth in claim 1, wherein the average degree of polymerization of said at least one member is between 20 and 30, the degree of polymerization of said polyvinyl alcohol is between 500 and 2000, and the saponification value of said polyvinyl alcohol is at leeast 85%, said at least one member being substantially free from polymeric molecules having a branched chain.

8. A composition as set forth in claim 1, wherein said at least one member is amylose having a mean degree of polymerization of 20 to 30.

References Cited

UNITED STATES PATENTS

| | | | |
|---|---|---|---|
| 3,329,525 | 7/1967 | Powers | 117—155 |
| 3,312,641 | 4/1967 | Young | 260—17.4 |
| 3,652,541 | 3/1972 | Hjermstad et al. | 260—233.3 R |
| 3,227,192 | 1/1966 | Griffiths | 139—420 |

WILLIAM H. SHORT, Primary Examiner

E. WOODBURY, Assistant Examiner

U.S. Cl. X.R.

117—161 R, 165